US010712846B2

(12) United States Patent
Wang et al.

(10) Patent No.: US 10,712,846 B2
(45) Date of Patent: Jul. 14, 2020

(54) TOUCH DISPLAY PANEL AND METHOD FOR DRIVING THE SAME, AND TOUCH DEVICE

(71) Applicants: Shanghai Tianma Micro-Electronics Co., Ltd., Shanghai (CN); Tianma Micro-Electronics Co., Ltd., Shenzhen (CN)

(72) Inventors: Lihua Wang, Shanghai (CN); Xingyao Zhou, Shanghai (CN); Xianxiang Zhang, Shanghai (CN); Yingying Xu, Shanghai (CN); Xiaoye Li, Shanghai (CN); Gang Liu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 757 days.

(21) Appl. No.: 14/741,381

(22) Filed: Jun. 16, 2015

(65) Prior Publication Data

US 2016/0162084 A1    Jun. 9, 2016

(30) Foreign Application Priority Data

Dec. 4, 2014 (CN) .......................... 2014 1 0735941

(51) Int. Cl.
*G09G 5/00* (2006.01)
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04111* (2013.01)

(58) Field of Classification Search
CPC ......... G06F 3/0412; G06F 2203/04111; G06F 3/044–3/0448; G02F 1/13338; H01L 27/323; H01L 27/124; H01L 27/3276
(Continued)

(56) References Cited

U.S. PATENT DOCUMENTS

2009/0122248 A1* 5/2009 Kim .................. G02F 1/134309
                                              349/139
2009/0322704 A1* 12/2009 Anno ...................... G06F 3/044
                                              345/174
(Continued)

FOREIGN PATENT DOCUMENTS

| CN | 103076935 A | 5/2013 |
|---|---|---|
| CN | 103207718 A | 7/2013 |
| KR | 1020110104349 A | 9/2011 |

*Primary Examiner* — Jennifer T Nguyen
(74) *Attorney, Agent, or Firm* — Alston & Bird LLP (57) ABSTRACT

A touch display panel is disclosed. The touch display panel includes first touch electrodes and second touch sub-electrodes. The first touch electrodes are insulated from and intersect with the second touch sub-electrodes. At least two of the first touch electrodes are connected as at least one first touch electrode group, where each first touch electrode group is connected with a touch drive detection unit through a wire. In addition, second touch sub-electrodes corresponding to each of the first touch electrode groups form a second touch electrode group. Each second touch electrode group includes second touch electrode units, each including at least two second touch sub-electrodes. Each of the second touch sub-electrodes is connected with the touch drive detection unit through a different wire. Additionally, the touch drive detection unit transmits a touch drive signal to or receives a detection signal from the first touch electrodes or the second touch sub-electrodes.

13 Claims, 8 Drawing Sheets

(58) Field of Classification Search
USPC .................................................. 345/173, 174
See application file for complete search history.

(56) References Cited

U.S. PATENT DOCUMENTS

| | | | |
|---|---|---|---|
| 2011/0134073 A1* | 6/2011 | Ahn ........................ | G06F 3/044 345/174 |
| 2014/0048854 A1* | 2/2014 | Wang .................... | G06F 3/0412 257/254 |
| 2014/0078104 A1* | 3/2014 | Lee ........................ | G06F 3/044 345/174 |
| 2014/0253498 A1* | 9/2014 | Suzuki .................... | G06F 3/044 345/174 |
| 2014/0362010 A1* | 12/2014 | Liu ....................... | G06F 3/0418 345/173 |
| 2015/0015803 A1* | 1/2015 | Wang .................... | G06F 3/044 349/12 |
| 2015/0185942 A1* | 7/2015 | Kim ..................... | G06F 3/0412 345/173 |
| 2015/0220175 A1* | 8/2015 | Zhang .................... | G06F 3/044 345/178 |
| 2015/0268762 A1* | 9/2015 | Wang .................... | G06F 3/0412 345/174 |
| 2015/0277642 A1* | 10/2015 | Jiang ........................ | G06F 1/16 345/173 |
| 2015/0338976 A1* | 11/2015 | Yang .................... | G06F 3/0412 345/173 |
| 2016/0026297 A1* | 1/2016 | Shinkai .................. | G06F 3/044 345/174 |
| 2016/0188029 A1* | 6/2016 | Liu .................... | G02F 1/13338 345/174 |

* cited by examiner

TOUCH DISPLAY PANEL AND METHOD FOR DRIVING THE SAME, AND TOUCH DEVICE

CROSS-REFERENCES TO RELATED APPLICATIONS

This application claims the benefit of priority to Chinese Patent Application No. 201410735941.X, filed with the Chinese Patent Office on Dec. 4, 2014 and entitled "TOUCH DISPLAY PANEL AND METHOD FOR DRIVING THE SAME, AND TOUCH DEVICE", the content of which is incorporated herein by reference in its entirety.

TECHNICAL FIELD

The present invention relates to the field of display technologies and particularly to a touch display panel and a method for driving the same, and a touch device.

BACKGROUND OF THE INVENTION

Touch panels have become popularized gradually in people's life along with the rapid development of display technologies. Compared with a traditional display only capable of providing a display function, a display with a touch panel can enable a user to exchange information with a display control host, so the touch panel can completely or at least partially take the place of a general input device so that the existing display is capable of both displaying and touch control. At present the mostly widely applied touch panels are capacitive touch panels, capacitive touch panels are categorized into in-cell, oncell and attached capacitive touch panels by their relationships between themselves and Thin Film Transistors (TFTs) and Color Filter (CF) substrates, where the in-cell capacitive touch panel has become predominant in the development of touch control technologies due to its high integration, low thickness, superior performance and other advantages.

Figure 1:
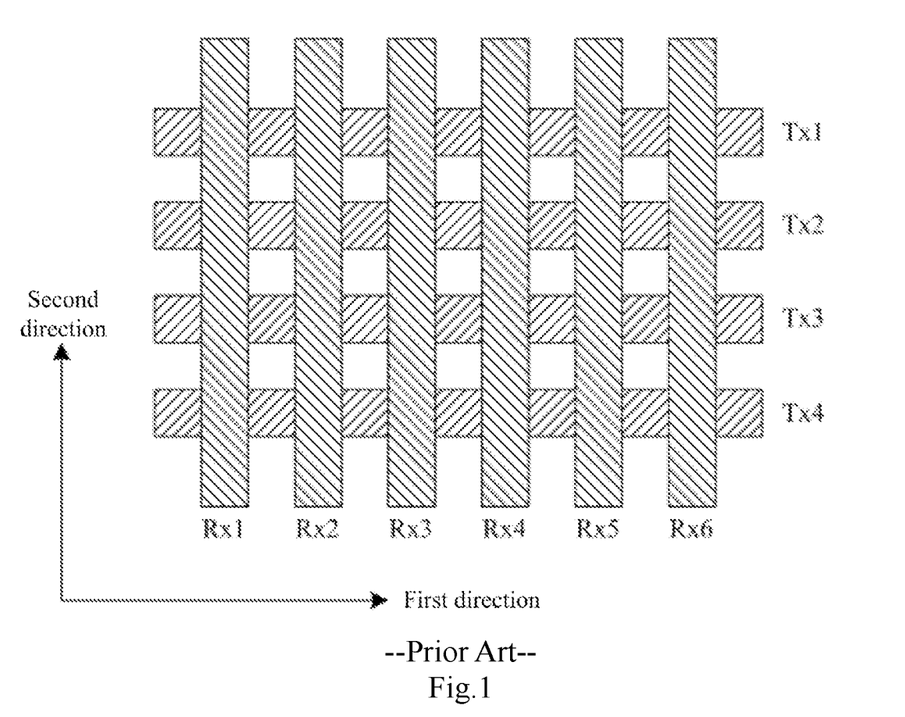
FIG. 1 illustrates a schematic diagram of a disposed structure of drive electrodes and detect electrodes in a touch panel in the prior art.

As illustrated in FIG. 1, a capacitive touch panel in the prior art includes a plurality of drive electrodes Tx, e.g., Tx1, Tx2, Tx3, Tx4, etc., disposed parallel to a first direction, and a plurality of detect electrodes Rx, e.g., Rx1, Rx2, Rx3, Rx4, Rx5, Rx6, etc., disposed parallel to a second direction. In a touch scan phase, the drive electrodes Tx are scanned by a drive scan signal row by row, and with a larger size of the touch panel, there are a larger number of channels to be scanned together with Tx, so it will take a longer period of time to scan Tx. For the in-cell touch panel, touch control and display has to be performed in a time-division manner in order to reduce interference with a display signal; and for a display Integrated Circuit (IC), a sufficiently long period of time has to be spared for touch control, and the period of time required for touch control is in direct proportion to the number of channels to be scanned, so that if a larger touch panel is provided with a larger number of channels, then there will be a longer period of time required for touch control and a shorter period of time spared for display scan, but the period of time spared for display scan can only be compressed to some limited extent, and consequently the capacitive touch panel in the prior art might be limited in its size of the panel which can be supported.

In summary, the design of the drive electrodes and the detect electrodes in the prior art might be greatly limited in its application to the touch panel with a large size.

BRIEF SUMMARY OF THE INVENTION

One inventive aspect is a touch display panel. The touch display panel includes a substrate, a plurality of first touch electrodes on the substrate, and a plurality of second touch sub-electrodes on the substrate, where the first touch electrodes are insulated from and intersect with the second touch sub-electrodes. At least two of the first touch electrodes are connected as at least one first touch electrode group, where each first touch electrode group is connected with a touch drive detection unit through a wire. In addition, a plurality of the second touch sub-electrodes corresponding to each of the first touch electrode groups form one of one or more second touch electrode groups, where each second touch electrode group includes a plurality of second touch electrode units. Furthermore, each of the second touch electrode units includes at least two second touch sub-electrodes, and each of the second touch sub-electrodes is connected with the touch drive detection unit through a different wire in the second touch electrode unit. Additionally, the touch drive detection unit is configured to transmit a touch drive signal to the first touch electrodes or to the second touch sub-electrodes or is configured to receive a detection signal from the first touch electrodes or from the second touch sub-electrodes.

DETAILED DESCRIPTION OF THE PREFERRED EMBODIMENTS

Embodiments of the present invention provide a touch display panel and a method for driving the same, and a touch device so as to reduce the number of scan channels of first touch electrodes, to shorten a scan period of time for touch scan and to narrow a frame of the touch display panel.

In order to make the objects, technical solutions and advantages of the present invention more apparent, the present invention will be described below in further details with reference to the drawings, and apparently embodiments to be described are merely a part but not all of embodiments of the present invention. Based upon embodiments here of the present invention, all the other embodiments which may occur to those ordinarily skilled in the art without any inventive effort will fall into the scope of the present invention.

The technical solutions according to embodiments of the present invention will be described below in details.

Figure 2:
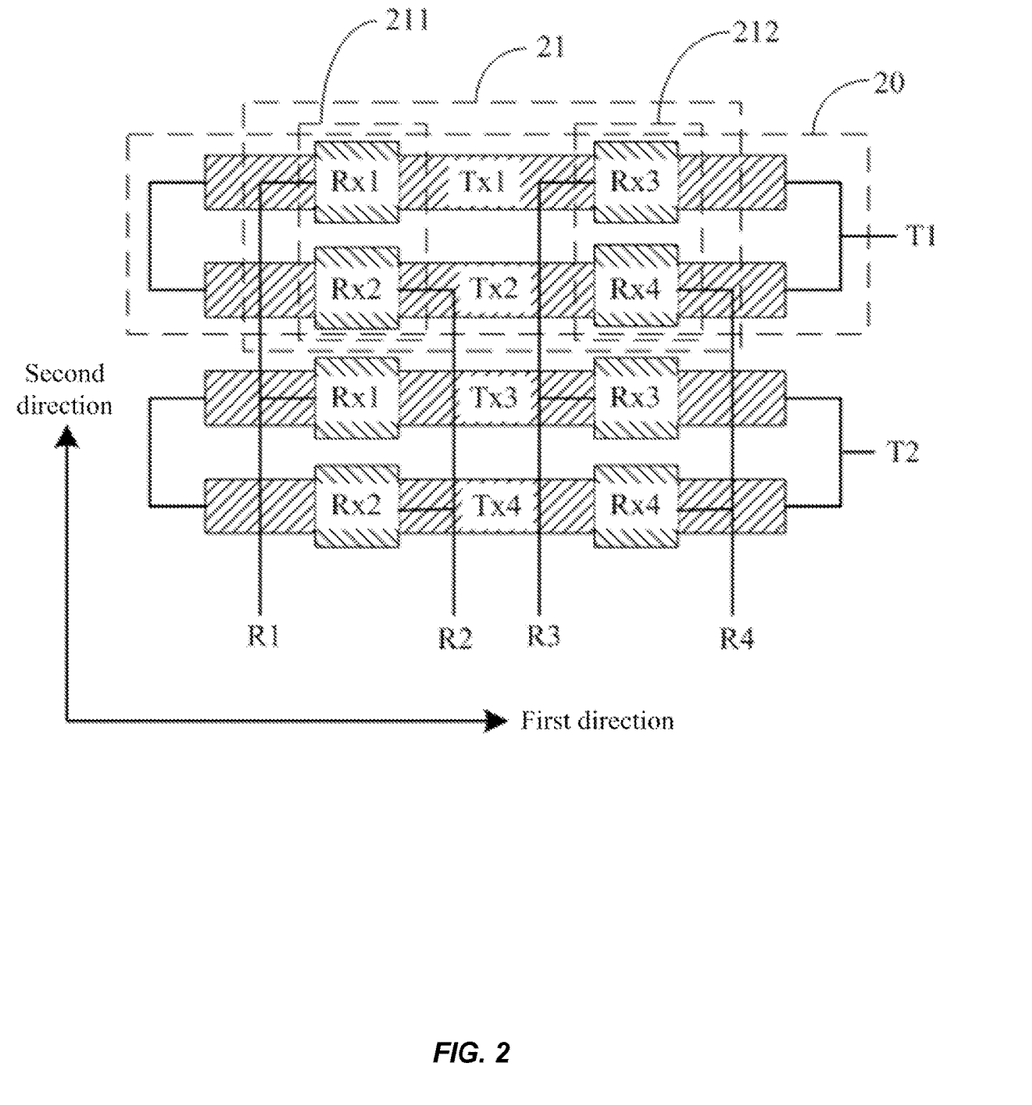
FIG. 2 illustrates a schematic diagram of a disposed structure of first touch electrodes and second touch sub-electrodes in a touch display panel according to an embodiment of the present invention.

FIG. 2 illustrates a touch display panel according to an embodiment of the present invention, which includes a substrate (not illustrated), and a plurality of first touch electrodes Tx including Tx1, Tx2, Tx3 and Tx4 disposed parallel to a first direction, and a plurality of second touch sub-electrodes Rx including Rx1, Rx2, Rx3 and Rx4 disposed parallel to a second direction, on the substrate, where the first touch electrodes Tx are insulated from and intersect with the second touch sub-electrodes Rx; and in an embodiment of the present invention, the first direction is the horizontal direction for an example, and the second direction is the vertical direction for an example, or alternatively the first direction may be the vertical direction, and the second direction may be the horizontal direction. Alike for the sake of a convenient description, the first touch electrodes are referred to as touch drive electrodes Tx, and the second touch sub-electrodes are referred to as touch detection electrodes RX, by way of an example in the description above (FIG. 2). Alternatively, the first touch 1 electrodes may be touch detection electrodes Rx, and the second touch sub-electrodes may be touch drive electrodes Tx; and the same will apply hereinafter in this context, that is, the first touch electrodes will be referred to as touch drive electrodes Tx, and the second touch sub-electrodes will be referred to as touch detection electrodes RX, by way of an example, unless otherwise stated, where:

At least two first touch electrodes Tx are connected together as a first touch electrode group 20, and each first touch electrode group 20 is connected with a touch drive detection unit (not illustrated) through a wire; and for the sake of a convenient description of the first touch electrode group formed in an embodiment of the present invention, four first touch electrodes Tx will be described below as an example in an embodiment of the present invention, where the first touch electrode in the first row and the first touch electrode in the second row are electrically connected together as a first touch electrode group 20 connected with the touch drive detection unit through a wire T1; and the first touch electrode in the third row and the first touch electrode in the fourth row are electrically connected together as another first touch electrode group connected with the touch drive detection unit through another wire T2. Alternatively, the first touch electrode in the first row and the first touch electrode in the third row may be electrically connected together as a first touch electrode group, and the first touch electrode in the second row and the first touch electrode in the fourth row may be electrically connected together as another first touch electrode group, particularly with reference to FIG. 4 and FIG. 5.

The second touch sub-electrodes Rx corresponding to each first touch electrode group 20 are a second touch electrode group 21, and each second touch electrode group 21 includes a plurality of second touch electrode units 211, each of which includes at least two touch sub-electrodes, for example, the second touch electrode unit 211 in the first column includes the second touch sub-electrodes Rx1 and Rx2, and the second touch electrode units 212 in the second column includes the second touch sub-electrodes Rx3 and Rx4; and each second touch sub-electrode is connected with the touch drive detection unit (not illustrated) through different wires in the second touch electrode unit 211, for example, the second touch sub-electrodes Rx1 and Rx2 in the second touch electrode unit 211 are connected with the detection unit (not illustrated) through wires R1 and R2, and the second touch sub-electrodes Rx3 and Rx3 in the second touch electrode unit 211 are connected with the detection unit (not illustrated) through wires R3 and R4.

In an embodiment of the present invention, at least two first touch electrodes are electrically connected together as a first touch electrode group, but the first touch electrodes electrically connected together receive the same touch drive signal, so touch positions on the first touch electrodes which electrically connected together cannot be distinguished from each other, and in an embodiment of the present invention, in order to determine accurately a touch position on the touch display panel, the design of the second touch sub-electrodes can be modified, so that the second touch sub-electrodes corresponding to each first touch electrode group are a second touch electrode group, and each second touch electrode group includes a plurality of second touch electrode units. Reference can be made to FIG. 2 to FIG. 5 for a particular structure thereof.

The structure of the touch display panel according to an embodiment of the present invention will be described below in details.

Figure 3:
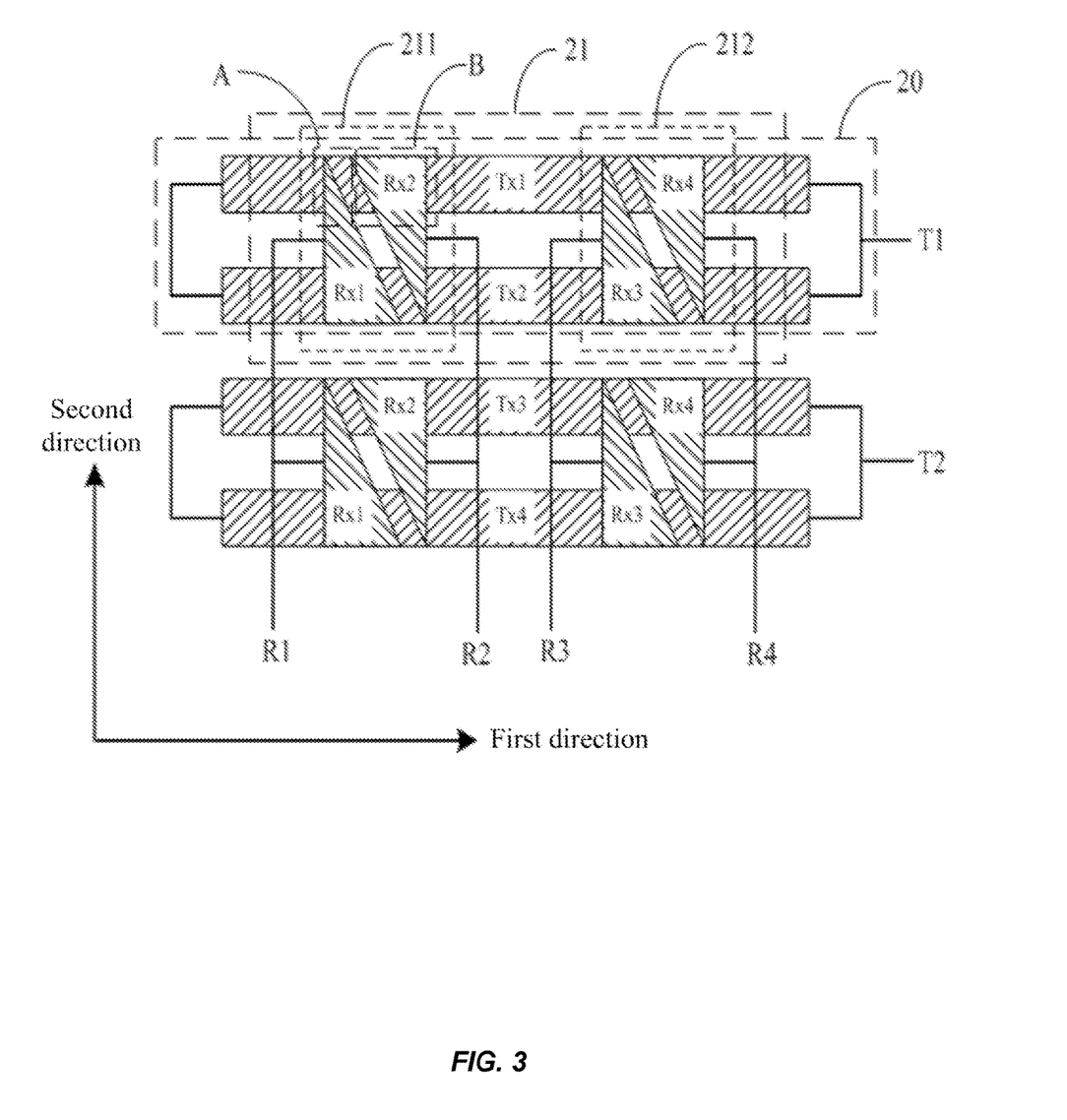
FIG. 3 illustrates another schematic diagram of a disposed structure of first touch electrodes and second touch sub-electrodes in the touch display panel according an embodiment of the present invention.

As illustrated in FIG. 2 and FIG. 3, the first touch electrode group in an embodiment of the present invention includes two adjacent first touch electrodes electrically connected, and two adjacent first touch electrodes being electrically connected as the first touch electrode group in an embodiment of the present invention will be described as an example below in details with reference to the drawings.

As illustrated in FIG. 2, the first touch electrode group including the first touch electrodes Tx1 and Tx2 connected through the wire T1 will be described below as an example, where each second touch electrode unit 211 includes two second touch sub-electrodes, for example, the second touch electrode unit 211 in the first column includes the second touch sub-electrodes Rx1 and Rx2, and the second touch electrode unit 212 in the second column includes the second touch sub-electrodes Rx3 and Rx4, and the second touch sub-electrodes correspond in a one-to-one manner to the first touch electrodes, that is, one of the second touch sub-electrodes corresponds to one of the first touch electrodes. Preferably in an embodiment of the present invention, the first touch electrodes are strip-shaped electrodes, and the second touch sub-electrodes are strip-shaped electrodes, because the strip-shaped electrodes are more convenient and easier to design in reality.

As illustrated in FIG. 3, the first touch electrode group including the first touch electrodes Tx1 and Tx2 connected through the wire T1 will be described below as an example, where each second touch electrode unit 211 includes two second touch sub-electrodes, for example, the second touch electrode unit 211 in the first column includes the second touch sub-electrodes Rx1 and Rx2, and the second touch electrode unit 212 in the second column includes the second touch sub-electrodes Rx3 and Rx4; and each of the second touch sub-electrodes corresponds to all the first touch electrodes in one of the first touch electrode group, and respective projections of the different second touch sub-electrodes in the vertical direction of one first touch electrode all have overlapping regions and the overlapping regions are different in area, for example, the second touch sub-electrode Rx1 corresponds to both the first touch electrode Tx1 in the first row and the first touch electrode Tx2 in the second row in the first touch electrode group, and also the second touch sub-electrode Rx2 corresponds to both the first touch electrode Tx1 in the first row and the first touch electrode Tx2 in the second row in the first touch electrode group, and projections of both the second touch sub-electrodes Rx1 and Rx2 in the vertical direction respectively overlap with a projection in the vertical direction of the first touch electrode Tx1 or Tx2, and the overlapping regions are different in area, for example, the area of the overlapping region of the projections of the second touch sub-electrode Rx1 and the first touch electrode Tx1 in the vertical direction is A, and the area of the overlapping region of the projections of the second touch sub-electrode Rx2 and the first touch electrode Tx2 in the vertical direction is B, where the area A is larger than the area B.

Preferably in an embodiment of the present invention, the first touch electrodes are strip-shaped, and the second touch sub-electrodes are shaped in any preset shape; and the preset electrodes in the any shape correspond to all the first touch electrodes in the respective of first touch electrode group, and projections in the vertical direction of the different preset electrodes in the any shape in one second touch electrode unit overlap with a projection in the vertical direction of one first touch electrode, and the overlapping regions are different in area. Particularly in an embodiment of the present invention, the shape of the preset electrodes is a right triangle as illustrated in FIG. 3 where two perpendicular sides of the right triangle are parallel respectively to the horizontal direction and the vertical direction, any two such right triangles are identical in area and can be combined together into a rectangle, and in a practical design, the rectangular, into which these two right triangles are combined together, is the second touch sub-electrode in the first column, and similarly the second touch sub-electrode Rx3 and the second touch sub-electrode Rx4 are combined into the second touch sub-electrode in the second column. In an embodiment of the present invention, the shape of the preset electrodes is designed as a triangle because the triangle is easy to distinguish in area and graphically simple and also facilitates uniformity of signals, and in an embodiment of the present invention, two triangles are combined together into a rectangular because it is convenient and easy to design a practical panel. the any shape of the preset electrodes in an embodiment of the present invention will not be limited to a triangle but may alternatively be another shape, e.g., a trapezoid, as long as one of two trapezoids in a second touch electrode unit gradually increments in area and the other trapezoid gradually decrements in area from the top to the bottom or from the bottom to the top, and the same will apply to any other pattern, so a repeated description thereof will be omitted here.

Figure 4:
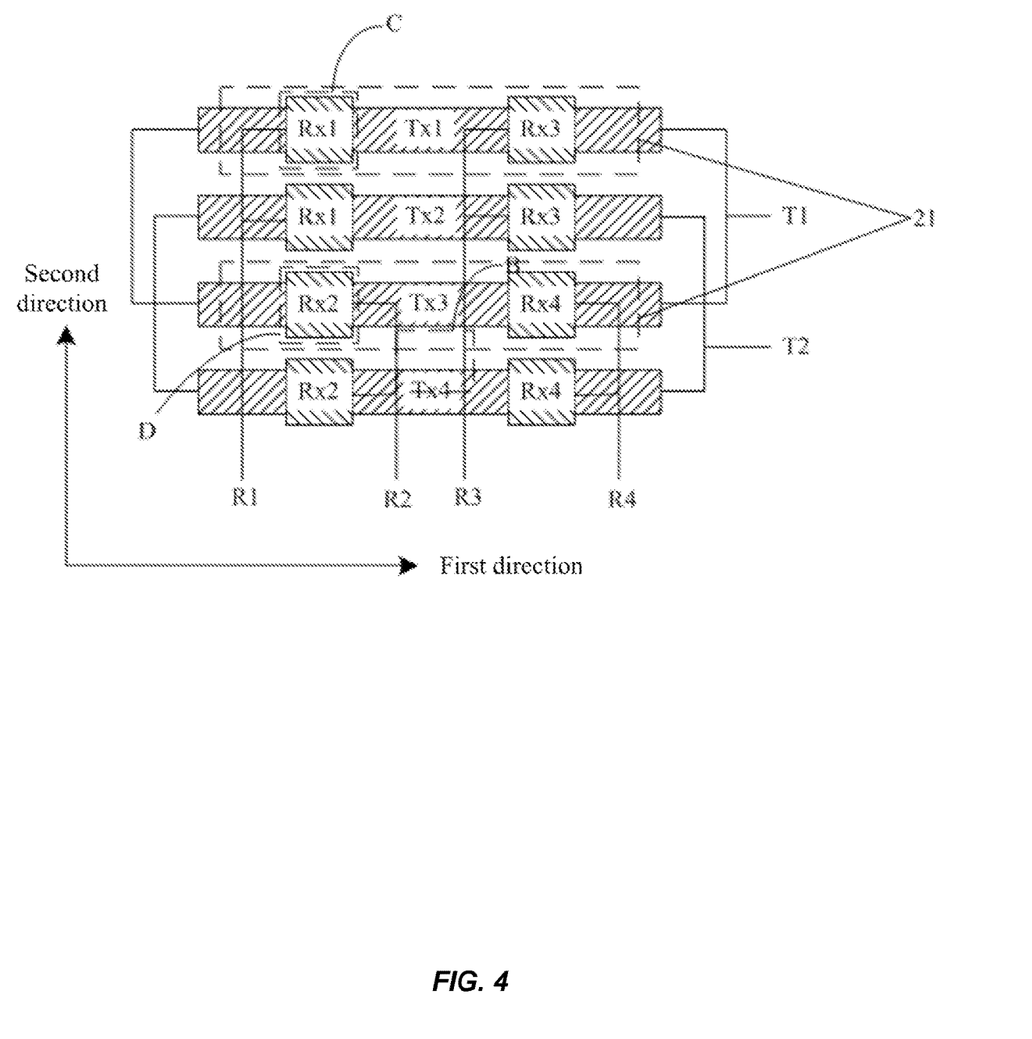
FIG. 4 illustrates a schematic diagram of a disposed structure of first touch electrodes and second touch sub-electrodes disposed in another touch display panel according to an embodiment of the present invention.
Figure 5:
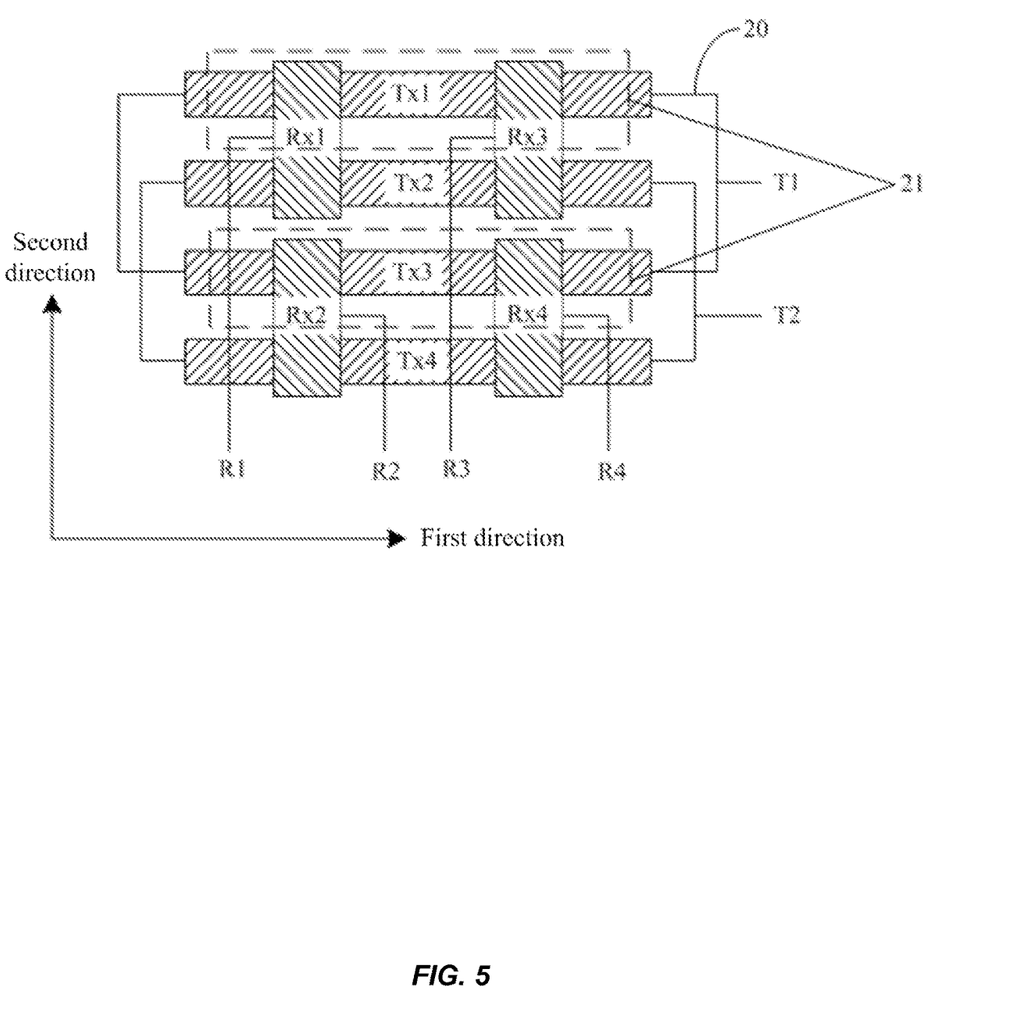
FIG. 5 illustrates another schematic diagram of a disposed structure of first touch electrodes and second touch sub-electrodes in the other touch display panel according an embodiment of the present invention.

As illustrated in FIG. 4 and FIG. 5, the first touch electrode group in an embodiment of the present invention includes at least nonadjacent two of the first touch electrodes electrically connected, and the first touch electrode group including two spaced first touch electrodes electrically connected in an embodiment of the present invention will be described as an example below in details with reference to the drawings.

As illustrated in FIG. 4 and FIG. 5, the first touch electrode group including the first touch electrodes Tx1 and Tx3 connected through the wire T1 will be described below as an example, where the second touch sub-electrodes corresponding to the first touch electrode group connected through the wire T1 are a second touch electrode group, for example, all the second touch sub-electrodes corresponding to the first touch electrodes in the first row and the first touch electrodes in the third row are a second touch electrode group 21 in which the second touch sub-electrode Rx1 and the second touch sub-electrode Rx2 are a second touch electrode unit, and the second touch sub-electrode Rx3 and the second touch sub-electrode Rx4 are another second touch electrode unit, and the second touch sub-electrodes correspond in a one-to-one manner to the first touch electrodes, that is, respective one of the second touch sub-electrodes corresponds to respective one of the first touch electrodes. Preferably in an embodiment of the present invention, the first touch electrodes are strip-shaped electrodes, and the second touch sub-electrodes are strip-shaped electrodes.

Preferably in an embodiment of the present invention, projections in the vertical direction of two second touch sub-electrodes in each second touch electrode unit overlap with projections in the vertical direction of the two different first touch electrodes corresponding to the second touch sub-electrodes, and the overlapping regions are identical in area, for example, the projection in the vertical direction of the second touch sub-electrode Rx1 in the second touch electrode unit overlaps with a projection in the vertical direction of the first touch electrode Tx1 corresponding to the second touch sub-electrode in an overlapping region which can be denoted as C, and the projection in the vertical direction of the second touch sub-electrode Rx2 in the second touch electrode unit overlaps with a projection in the vertical direction of the first touch electrode Tx3 corresponding to the second touch sub-electrode in an overlapping region which can be denoted as D, where the overlapping regions C and D are identical in area. The second touch sub-electrodes, projections in the vertical direction of which overlap with projections of two adjacent first touch electrodes in overlapping regions are connected through the same wire, and preferably the overlapping regions can be set identical in area.

In a particular design, since second touch sub-electrodes, projections in the vertical direction of which overlap with projections in the vertical direction of two adjacent first touch electrodes in overlapping regions, are connected through the same wire, the second touch sub-electrodes, projections in the vertical direction of which overlap with projections in the vertical direction of two adjacent first touch electrodes in overlapping regions, can be disposed as consecutive electrodes, and as illustrated in FIG. 5, the second touch sub-electrodes Rx1, the projections in the vertical direction of which overlap with projections of the first touch electrodes Tx1 and Tx2 in the vertical direction, are disposed as consecutive electrodes. Alternatively, second touch sub-electrodes, projections in the vertical direction of which overlap with projections in the vertical direction of two adjacent first touch electrodes in overlapping regions, can be disposed as non-consecutive electrodes as illustrated in FIG. 4.

An embodiment of the present invention further provides a method for driving the touch display panel above, the method including:

In a touch phase of the touch display panel, when the first touch electrodes are drive electrodes, and the second touch sub-electrodes are detect electrodes, the first touch electrodes receive a touch drive signal, and the second touch sub-electrodes output detection signals, from which coordinates of a touch position on the touch display panel are determined, by coupling the touch drive signal received by the first touch electrodes; or In a touch phase of the touch display panel, the first touch electrodes receive a touch drive signal and output detection signals from which a coordinate of a touch position on the touch display panel in a first direction; and the second touch sub-electrodes receive the touch drive signal and output detection signals from which a coordinate of the touch position on the touch display panel in a second direction.

The driving method in which the first touch electrodes are drive electrodes and the second touch sub-electrodes are detect electrode has been generally described in an embodiment of the present inventions, and how to accurately determine the touch position on the touch display panel in an embodiment of the present invention will be described below in details with reference to the structure of the first touch electrodes and the second touch sub-electrodes in FIG. 2 to FIG. 5.

As illustrated in FIG. 2 and FIG. 3, the first touch electrode group in an embodiment of the present invention includes at least two adjacent first touch electrodes electrically connected, and the first touch electrode group including at least two adjacent first touch electrodes electrically connected in an embodiment of the present invention will be described below as an example. In a first embodiment of the present invention, there are two designs of the second touch sub-electrode, which will be described below in details with reference to the drawings.

As illustrated in FIG. 2, the first touch electrode group connected through the wire T1 will be described below as an example, where each second touch electrode unit 211 includes two second touch sub-electrodes, for example, the second touch electrode unit 211 in the first column includes the second touch sub-electrodes Rx1 and Rx2, and the second touch electrode unit 212 in the second column includes the second touch sub-electrodes Rx3 and Rx4, and the second touch sub-electrodes correspond in a one-to-one manner to the first touch electrodes, that is, one of the second touch sub-electrodes corresponds to one of the first touch electrodes. Preferably in an embodiment of the present invention, the first touch electrodes are strip-shaped electrodes, and the second touch sub-electrodes are strip-shaped electrodes.

In a touch phase of the touch display panel, the first touch electrodes receive a touch drive signal row by row by the wires through which the groups of first touch electrodes, where they are located, are connected, and the second touch sub-electrodes output detection signals by coupling the touch drive signal received by the first touch electrodes, and particularly the second touch sub-electrodes output the detection signals by the wires through which the second touch sub-electrodes are connected, where coordinates of a touch position on the touch display panel are determined from the detection signals.

Particularly when there is no touch occurring on the touch display panel, the detection signals output by the wires, through which the second touch sub-electrodes are connected, remain unchanged. When the touch drive signal is received by the wire T1, the detection signal output by the wire R1, through which the second touch sub-electrodes are connected, is changed, and the touch drive detection unit connected with the wire R1 can determine a touch occurring at the first touch electrode in the first row and the second touch sub-electrode in the first column at that time, and a particular detection process of the detection unit is the same as that in the prior art, so a repeated description thereof will be omitted here. When the strength of the detection signal output by the wire R2, through which the second touch sub-electrodes are connected, is changed, the touch drive detection unit connected with the wire R2 can determine a touch occurring at the first touch electrode in the second row and the second touch sub-electrode in the first column at that time. Thus the one with a touch occurring of the two first touch electrodes connected through the same wire T1 can be distinguished by the two second touch sub-electrodes Rx1 and Rx2 in the second touch electrode unit 211 in the first column. Alike when the strength of the detection signal output by the wire R3 is changed, the touch drive detection unit connected with the wire R3 can determine a touch occurring at the first touch electrode in the first row and the second touch sub-electrode in the second column at that time; and when the strength of the detection signal output by the wire R4 is changed, the touch drive detection unit connected with the wire R4 can determine a touch occurring at the first touch electrode in the second row and the second touch sub-electrode in the second column at that time.

Since the touch drive signal is received row by row by the wires through which the first touch electrode group are connected, when the touch drive signal is received by the wire T2 at that time, the detection signal output by the wire R1, through which the second touch sub-electrodes are connected, is changed in strength, the touch drive detection unit connected with the wire R1 can determine a touch occurring at the first touch electrode in the third row and the second touch sub-electrode in the first column at that time; and when the touch drive signal is received by the wire T2 at that time, the detection signal output by the wire R2, through which the second touch sub-electrodes are connected, is changed in strength, the touch drive detection unit connected with the wire R2 can determine a touch occurring at the first touch electrode in the fourth row and the second touch sub-electrode in the first column at that time. A touch occurring at the first touch electrodes in the other rows and the second touch sub-electrodes in the other columns can be detected similarly thereto, so a repeated description thereof will be omitted here.

As illustrated in FIG. 3, the first touch electrode group connected through the wire T1 will be described below as an example, where each second touch electrode unit 211 includes two second touch sub-electrodes, for example, the second touch electrode unit 211 in the first column includes the second touch sub-electrodes Rx1 and Rx2, and the second touch electrode unit 212 in the second column includes the second touch sub-electrodes Rx3 and Rx4; and each of the second touch sub-electrodes corresponds to all the first touch electrodes in one of the first touch electrode group, and projections in the vertical direction of all the different second touch sub-electrodes overlap with a projection in the vertical direction of the same first touch electrode, and the overlapping regions are different in area, for example, the second touch sub-electrode Rx1 corresponds to both the first touch electrode Tx1 in the first row and the first touch electrode Tx2 in the second row in the first touch electrode group, and also the second touch sub-electrode Rx2 corresponds to both the first touch electrode Tx1 in the first row and the first touch electrode Tx2 in the second row in the first touch electrode group, and projections in the vertical direction of both the second touch sub-electrodes Rx1 and Rx2 overlap with a projection in the vertical direction of the first touch electrode in the first row or the second row, and the overlapping regions are different in area.

Preferably in an embodiment of the present invention, the first touch electrodes are strip-shaped, and the second touch sub-electrodes are preset electrodes corresponding to all the first touch electrodes in the respective first touch electrode group, and projections in the vertical direction of the different preset electrodes in the any shape in one second touch electrode unit overlap with a projection in the vertical direction of the same first touch electrode, and the overlapping regions are different in area. Particularly in an embodiment of the present invention, the shape of the preset electrodes is a right triangle as illustrated in FIG. 3 where two perpendicular sides of the right triangle are horizontal respectively to the horizontal direction and the vertical direction, any two such right triangles are identical in area and can be combined together into a rectangle, and in a practical design, the rectangular, into which these two right triangles are combined together, is the second touch sub-electrode in the first column, and alike the second touch sub-electrode Rx3 and the second touch sub-electrode Rx4 are combined into the second touch sub-electrode in the second column.

In a touch phase of the touch display panel, the first touch electrodes receive a touch drive signal row by row by the wires through which the first touch electrode group where they are located, are connected, and the second touch sub-electrodes output detection signals, from which coordinates of a touch position on the touch display panel are determined, by coupling the touch drive signal received by the first touch electrodes. When there is no touch occurring on the touch display panel, the detection signal output by the wires, through which the second touch sub-electrodes are connected, remains unchanged.

When the touch drive signal is received by the wire T1, in a practical touch, there is a short distance between the second touch sub-electrodes Rx1 and Rx2, so when there is a touch occurring in the first column on the touch display panel, both the detection signals output by the wire R1 through which second touch sub-electrode Rx1 is connected and the wire R2 through which second touch sub-electrode Rx2 is connected are changed in strength. When both the detection signal output by the wire R1 and the detection signal output by the wire R2 are changed in strength, since the area of the overlapping region of the projection of Rx1 in the vertical direction with a projection of the first touch electrode in the second row in the vertical direction is larger than the area of the overlapping region of its projection in the vertical direction with a projection of the first touch electrode in the first row in the vertical direction, and the area of the overlapping region of the projection of Rx2 in the vertical direction with a projection of the first touch electrode in the first row in the vertical direction is larger than the area of the overlapping region of its projection in the vertical direction with a projection of the first touch electrode in the second row in the vertical direction, thus if the touch drive detection unit connected with the wires R1 and R2 detects a larger change in strength of the detection signal output by the wire R1 and a smaller change in strength of the detection signal output by the wire R2 at that time, then it determines a touch occurring at the first touch electrode in the second row and the second touch sub-electrode in the first column at that time; and if the touch drive detection unit connected with the wires R1 and R2 detects a smaller change in strength of the detection signal output by the wire R1 and a larger change in strength of the detection signal output by the wire R2 at that time, then it determines a touch occurring at the first touch electrode in the first row and the second touch sub-electrode in the first column at that time. Thus the one with a touch occurring of the two first touch electrodes connected through the same wire T1 can be distinguished by the two second touch sub-electrodes Rx1 and Rx2 in the second touch electrode unit 211. A touch occurring at the first touch electrodes in the other rows and the second touch sub-electrodes in the other columns can be detected similarly thereto, so a repeated description thereof will be omitted here.

As illustrated in FIG. 4 and FIG. 5, the first touch electrode group in an embodiment of the present invention includes nonadjacent two of the first touch electrodes electrically connected, and the first touch electrode group including two spaced first touch electrodes electrically connected in an embodiment of the present invention will be described as an example below in details.

As illustrated in FIG. 4 and FIG. 5, the first touch electrode group connected through the wire T1 will be described below as an example, where the second touch sub-electrodes corresponding to the first touch electrode group connected through the wire T1 are a second touch electrode group 21, for example, all the second touch sub-electrodes corresponding to the first touch electrodes in the first row and the first touch electrodes in the third row are a second touch electrode group 21 in which the second touch sub-electrode Rx1 and the second touch sub-electrode Rx2 are a second touch electrode unit, and the second touch sub-electrode Rx3 and the second touch sub-electrode Rx4 are another second touch electrode unit, and the second touch sub-electrodes correspond in a one-to-one manner to the first touch electrodes, that is, respective one of the second touch sub-electrodes corresponds to respective one of the first touch electrodes. Preferably in an embodiment of the present invention, the first touch electrodes are strip-shaped electrodes, and the second touch sub-electrodes are strip-shaped electrodes.

Preferably in an embodiment of the present invention, projections in the vertical direction of two second touch sub-electrodes in each second touch electrode unit overlap with projections in the vertical direction of the two different first touch electrodes corresponding to the second touch sub-electrodes in overlapping regions equal in area, for example, the projection in the vertical direction of the second touch sub-electrode Rx1 in the second touch electrode unit overlaps with a projection in the vertical direction of the first touch electrode in the first row corresponding to the second touch sub-electrode in an overlapping region which can be denoted as C, and the projection in the vertical direction of the second touch sub-electrode Rx2 in the second touch electrode unit overlaps with a projection in the vertical direction of the first touch electrode in the third row corresponding to the second touch sub-electrode in an overlapping region which can be denoted as D, where the overlapping regions C and D are identical in area. Second touch sub-electrodes, projections of which in the vertical direction overlap with projections in the vertical direction of two adjacent first touch electrodes in overlapping regions are connected through the same wire, and preferably the overlapping regions can be set identical in area.

In a particular design, since second touch sub-electrodes, projections in the vertical direction, of which overlap with projections in the vertical direction of two adjacent first touch electrodes in overlapping regions are connected through the same wire, second touch sub-electrodes, projections in the vertical direction of which overlap with projections in the vertical direction of two adjacent first touch electrodes in overlapping regions can be disposed as consecutive electrodes, and as illustrated in FIG. 5, the second touch sub-electrodes Rx1, the projections of which in the vertical direction overlap with projections of the first touch electrodes in the first row and the first touch electrodes in the second row in the vertical direction are disposed as consecutive electrodes. Alternatively, the second touch sub-electrodes, projections in the vertical direction, of which overlap with projections in the vertical direction of two adjacent first touch electrodes in overlapping regions can be disposed as non-consecutive electrodes as illustrated in FIG. 4.

In a touch phase of the touch display panel, the first touch electrodes receive a touch drive signal row by row by the wires through which the s first touch electrode group, where they are located, are connected, and the second touch sub-electrodes output detection signals, from which coordinates of a touch position on the touch display panel are determined, by coupling the touch drive signal received by the first touch electrodes.

Particularly when there is no touch occurring on the touch display panel, the detection signals output by the wires, through which the second touch sub-electrodes are connected, remain unchanged. When the touch drive signal is received by the wire T1, the detection signal output by the wire R1, through which the second touch sub-electrodes are connected, is changed, and the touch drive detection unit connected with the wire R1 can determine a touch occurring at the first touch electrode in the first row and the second touch sub-electrode in the first column at that time; and when the detection signal output by the wire R2, through which the second touch sub-electrodes are connected, is changed in strength, the touch drive detection unit connected with the wire R2 can determine a touch occurring at the first touch electrode in the third row and the second touch sub-electrode in the first column at that time. Thus the one with a touch occurring of the two first touch electrodes connected through the same wire T1 can be distinguished by the two second touch sub-electrodes Rx1 and Rx2 in the second touch electrode unit in the first column. A touch occurring at the first touch electrodes in the other rows and the second touch sub-electrodes in the other columns can be detected similarly thereto, so a repeated description thereof will be omitted here.

Figure 6:
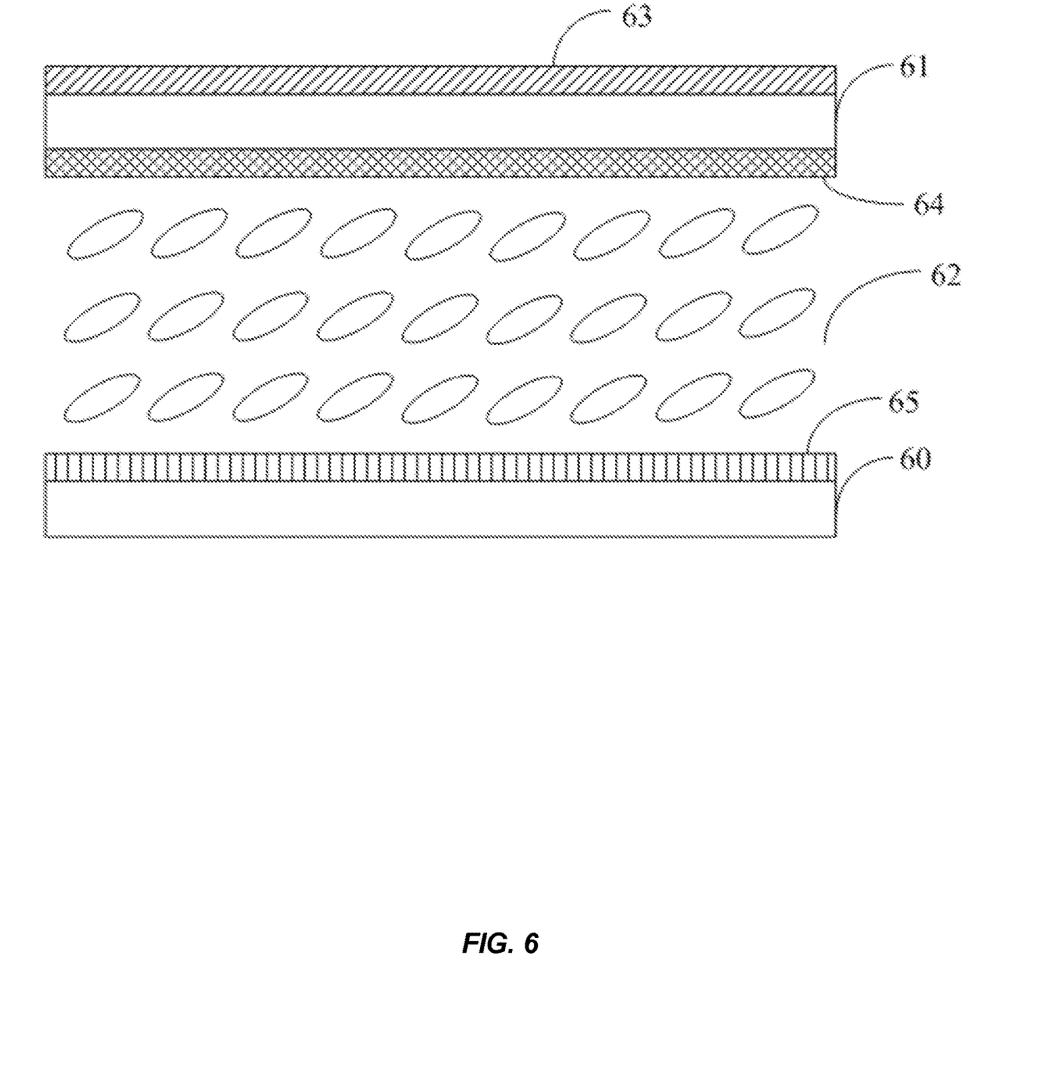
FIG. 6 illustrates a schematic diagram of a particular design of first touch electrodes and second touch sub-electrodes disposed in a touch display panel according to an embodiment of the present invention.

As illustrated in FIG. 6, the touch display panel according to an embodiment of the present invention can particularly an array substrate 60 and/or a color filter substrate 61, and a liquid crystal layer 62 located between the array substrate 60 and the color filter substrate 61, and in a particular design, both the first touch electrode and the second touch sub-electrodes can be disposed on the side 63 of the color filter substrate away from the array substrate or the side 64 thereof facing the array substrate, and the first touch electrode and the second touch sub-electrodes can be disposed on the same layer or can be stacked insulated from each other. Alike the first touch electrodes or the second touch sub-electrodes can be disposed on the side 63 of the color filter substrate away from the array substrate, and also the second touch sub-electrodes or the first touch electrodes can be disposed on the side 64 of the color filter substrate facing the array substrate or disposed on the side 65 of the array substrate facing the color filter substrate. When the first touch electrodes or the second touch sub-electrodes are disposed on the side 63 of the color filter substrate away from the array substrate, the second touch sub-electrodes or the first touch electrodes disposed on the side 64 of the color filter substrate facing the array substrate or the side 65 of the array substrate facing the color filter substrate can be disposed on the same layer as common electrodes which are used as transmission electrodes of a Vcom signal or drive or detect electrodes of a touch signal, and particular positions of the second touch sub-electrodes or the first touch electrodes can vary with a different display mode of the touch display panel. For example, when the display mode of the touch display panel is the TN mode, the common electrodes are located on the side 64 of the color film substrate facing the array substrate in this mode, and then the second touch sub-electrodes or the first touch electrodes are also located on the side 64 of the color film substrate facing the array substrate; and when the display mode of the touch display panel is the IPS or FFS mode, the common electrodes are located on the side 65 of the array substrate facing the color filter substrate in this mode, and then the second touch sub-electrodes or the first touch electrodes are also located on the side 65 of the array substrate facing the color filter substrate.

Figure 7:
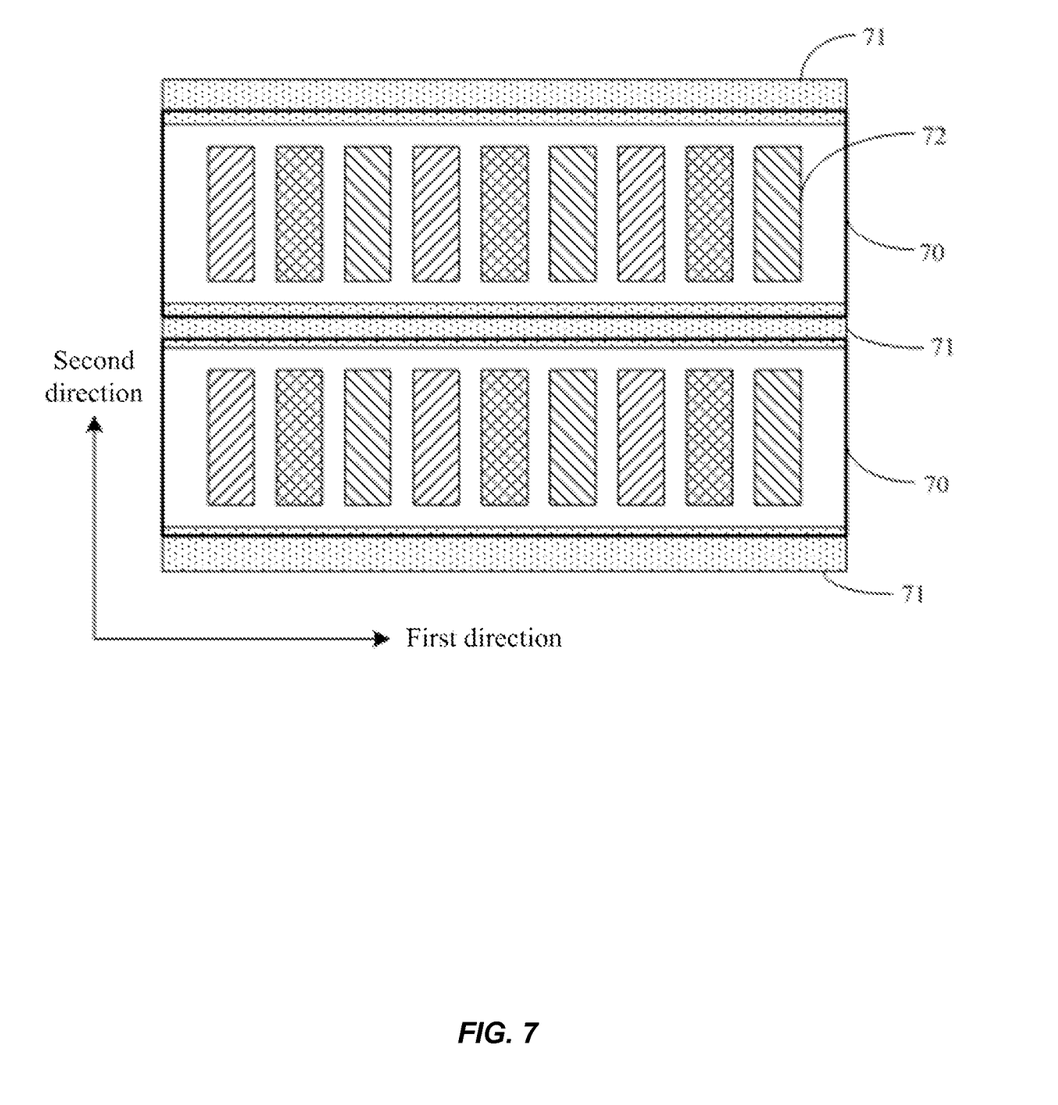
FIG. 7 illustrates a schematic structural diagram between first touch electrodes and gate lines according to an embodiment of the present invention.

When the first touch electrodes in an embodiment of the present invention are used as the common electrodes, as illustrated in FIG. 7, the touch display panel according to an embodiment of the present invention further includes a plurality of gate lines 71 parallel to the first touch electrodes 70, and projections of the first touch electrodes 70 in the vertical direction to the substrate are located between projections of two adjacent gate lines 71 in the vertical direction to the substrate, where a plurality of pixel electrodes 72 are distributed the two adjacent gate lines 71. The first touch electrodes 70 are non-consecutive in the substrate, and at this time the projections of the first touch electrodes 70 in the vertical direction to the substrate can overlap with the projections of the two adjacent gate lines 71 in the vertical direction to the substrate in overlapping regions. When the projections of the first touch electrodes 70 in the vertical direction have no overlapping regions with the projections of the gate lines 71 in the vertical direction, preferably the width of the first touch electrodes 70 in the vertical direction to the gate lines 71, i.e., in the second direction is smaller than or equal to the distance between the two adjacent gate lines 71, and at this time the first touch electrodes 70 can be located other than the positions of the gate lines 71 to thereby reduce a parasitic capacitance between the first touch electrodes 70 and the gate lines 71, where a parasitic capacitance between the common electrodes and the gate electrodes can be reduced in a practical application.

Figure 8:
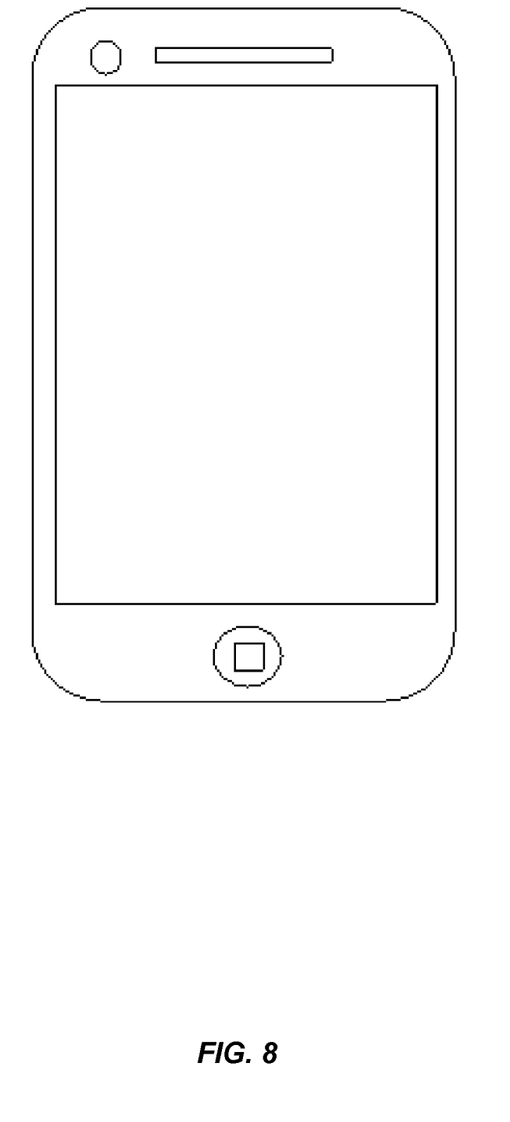
FIG. 8 illustrates a schematic structural diagram of a touch device according to an embodiment of the present invention.

As illustrated in FIG. 8, an embodiment of the present invention further provides a touch device including the touch display panel above according to an embodiment of the present invention, where the touch device can be a handset illustrated in FIG. 8, a computer or another touch device.

In summary, an embodiments of the present invention provide a touch display panel and method for driving the same, and a touch device, and since at least two first touch electrodes in the touch display panel are electrically connected together as a first touch electrode group, and each first touch electrode group are connected through one wire, so that touch scan can be performed on the first touch electrodes by reducing the number of scan channels and further shorten a scan period of time for touch scan to thereby facilitate improvements in a signal to noise ratio, a ratio of reporting points and other touch characteristics, and such a design may be well applied to a touch display panel with a large size, while reducing the number of scan channels and consequentially the number of the wires of the first touch electrodes or the number of first touch circuits, to thereby facilitate a narrower frame of the touch display panel.

Evidently those skilled in the art can make various modifications and variations to the present invention without departing from the spirit and scope of the present invention. Thus the present invention is also intended to encompass these modifications and variations thereto so long as the modifications and variations come into the scope of the claims appended to the present invention and their equivalents.

What is claimed is:

1. A touch display panel, comprising:
   a substrate;
   a plurality of first touch electrodes and a plurality of second touch sub-electrodes are disposed on the substrate; wherein the plurality of first touch electrodes each is insulated from the plurality of second touch sub-electrodes each respectively, wherein a quantity of the plurality of first touch electrodes is N and wherein N is an integer larger than 1;
   wherein each of the plurality of first touch electrodes extends in a first direction and is arranged apart from each other in a second direction perpendicular to the first direction; and
   wherein at least a pair of the first touch electrodes of the plurality of first touch electrodes are electrically connected to each other to form one first touch electrode group, wherein each first touch electrode in one of the same first touch electrode groups receives a same touch drive signal at a same time;
   wherein two or more of the plurality of the second touch sub-electrodes overlays with a same first touch electrode group in a direction perpendicular to the substrate, wherein said second touch sub-electrodes form one second touch electrode group, wherein the second touch electrode group comprises a plurality of second touch sub-electrodes, and wherein the plurality of second touch electrode units in the same second touch electrode group is arranged apart from each other in the first direction;
   wherein the plurality of the second touch electrode units each comprises at least two of the plurality of second touch sub-electrodes; wherein each of the second touch electrode units of said same second touch electrode group overlays with the first touch electrodes of the same first touch electrode group in the direction perpendicular to the substrate; and,
   wherein a quantity of the first touch electrodes overlaying with said second touch sub-electrodes each in the direction perpendicular to the substrate is m, wherein m is a positive integer smaller than N;
   where different second touch sub-electrodes of a same second touch electrode units are insulated from each other;
   wherein the different second touch sub-electrodes in the same second touch electrode units are connected with a touch drive detection unit through different wires respectively; and
   wherein said different second touch sub-electrodes detect touch signals from different first touch electrodes in the same first touch electrode group.

2. A method of driving a touch display panel of claim 1, the method comprising at least one of:
   in a touch phase of the touch display panel, wherein the first touch electrodes are drive electrodes, and the second touch sub-electrodes are detect electrodes, the first touch electrode groups receives a touch drive signal, and the second touch sub-electrodes output detection signals, wherein the detection signals indicate coordinates of a touch position on the touch display panel;
   or
   in a touch phase of the touch display panel, the first touch electrode groups receives a touch drive signal and output detection signals indicating a coordinate of a touch position on the touch display panel in the first direction, and the second touch sub-electrodes receive the touch drive signal and output detection signals indicating a coordinate of the touch position on the touch display panel in the second direction.

3. The method for driving a touch display panel according to claim 2, wherein the plurality of first touch electrodes are the drive electrodes, and the second touch sub-electrodes are the detect electrodes, wherein the first touch electrodes receive the touch drive signal row by row by the wires through which the first touch electrode groups are connected, and wherein the second touch sub-electrodes output the detection signals by the wires through which the second touch sub-electrodes are connected.

4. The touch display panel according to claim 1,
   wherein the second touch sub-electrodes in at least two second touch electrode units which belong to different second touch electrode groups and are arranged apart from each other in the second direction form at least two second touch electrode clusters, and different second touch sub-electrodes in a same second touch electrode cluster belong to different second touch electrode units; and
   wherein second touch sub-electrodes in a same second touch electrode cluster are connected to the touch drive detection unit through a same one wire.

5. The touch display panel according to claim 1,
   wherein the second touch sub-electrodes in one of the same second touch electrode units are arranged apart from each other in the second direction; and
   wherein said second touch sub-electrode and each first touch electrode in the same first touch electrode group has an overlapping area in the direction perpendicular to the substrate.

6. The touch display panel according to claim 5,
   wherein each of the second touch sub-electrodes and one of two adjacent first touch electrodes have an overlapping area; and
   wherein the two adjacent first touch electrodes belong to different first touch electrode groups.

7. The touch display panel according to claim 6, wherein the plurality of first touch electrode groups each comprises a plurality of electrically connected first touch electrodes not adjacent to each other.

8. The touch display panel according to claim 5,
   wherein said first touch electrodes are strip-shaped electrodes, and said second touch sub-electrodes are block electrodes arranged in an array.

9. The touch display panel according to claim 8, wherein the first touch electrodes in a same first touch electrode group are arranged in parallel, and the first touch electrodes each has a uniform width along an extending direction.

10. The touch display panel according to claim 1, wherein each of the second touch sub-electrodes in one of a same second touch electrode units overlaying to a first touch electrode group and with each first touch electrode in the first touch electrode group has an overlapping field, and each of the second touch sub-electrodes and each different first touch electrodes have different overlapping areas.

11. The touch display panel according to claim 10, wherein
    each one of the second touch electrode units comprises two second touch sub-electrodes, wherein the two second touch sub-electrodes each has a right triangle shape, and wherein one of said two second touch sub-electrodes is arranged with a hypotenuse opposite to a hypotenuse of another of the two second touch sub-electrodes.

12. The touch display panel according to claim 11, wherein an area of said right triangle shape is identical as other.

13. A touch device, comprising:
a substrate, a plurality of first touch electrodes and a plurality of second touch sub-electrodes disposed on the substrate, wherein the plurality of first touch electrodes each is insulated from the plurality of second touch sub-electrodes each respectively; wherein a quantity of the plurality of first touch electrodes is N and N is an integer larger than 1;
wherein each of the plurality of first touch electrodes extends in a first direction and is arranged apart from each other in a second direction perpendicular to the first direction; and
wherein at least a pair of the first touch electrodes of the plurality of first touch electrodes are electrically connected to each other to form one first touch electrode group; and wherein each first touch electrode in the same first touch electrode group receives a same touch drive signal at a same time;
wherein two or more of the plurality of the second touch sub-electrodes overlaying to the same first touch electrode group, in a direction perpendicular to the substrate, form one second touch electrode group, wherein the second touch electrode group comprises a plurality of second touch electrode units, and wherein the plurality of second touch electrode units in the same second touch electrode group is arranged apart from each other in the first direction;
wherein the plurality of the second touch electrode units each comprises at least two of the plurality of second touch sub-electrodes; wherein each of said second touch electrode units of said same second touch electrode group overlays with the first touch electrodes of the same first touch electrode group in the direction perpendicular to the substrate; and
wherein a quantity of the first touch electrodes overlaying with each second touch sub-electrode in the direction perpendicular to the substrate is L, wherein L<N, wherein L is a positive integer; wherein different second touch sub-electrodes of a same second touch electrode unit are insulated from each other;
wherein different second touch sub-electrodes in the same second touch electrode unit are connected with a touch drive detection unit through different wires respectively; and
wherein said different second touch sub-electrodes detect touch signals from different first touch electrodes in the same first touch electrode group.

* * * * *